United States Patent
Lu et al.

(10) Patent No.: US 10,851,206 B2
(45) Date of Patent: Dec. 1, 2020

(54) MODIFIED NYLON 66 FIBER

(71) Applicant: Taiwan Textile Research Institute, New Taipei (TW)

(72) Inventors: Tzu-Chung Lu, New Taipei (TW); Chin-Wen Chen, New Taipei (TW); Wei-Hsiang Lin, New Taipei (TW); Chao-Huei Liu, New Taipei (TW); Po-Hsun Huang, New Taipei (TW); Wei-Jen Lai, New Taipei (TW)

(73) Assignee: Taiwan Textile Research Institute, New Taipei (TW)

( * ) Notice: Subject to any disclaimer, the term of this patent is extended or adjusted under 35 U.S.C. 154(b) by 35 days.

(21) Appl. No.: 16/212,660

(22) Filed: Dec. 6, 2018

(65) Prior Publication Data

US 2019/0185623 A1 Jun. 20, 2019

(30) Foreign Application Priority Data

Dec. 18, 2017 (CN) ............................ 2017 1 1363902

(51) Int. Cl.
*C08G 69/26* (2006.01)
*D01F 6/80* (2006.01)

(52) U.S. Cl.
CPC ............. *C08G 69/265* (2013.01); *D01F 6/80* (2013.01)

(58) Field of Classification Search
None
See application file for complete search history.

(56) References Cited

U.S. PATENT DOCUMENTS

| | | | |
|---|---|---|---|
| 5,627,258 A | 5/1997 | Takayama et al. | |
| 7,772,329 B2 | 8/2010 | Yang et al. | |
| 9,023,975 B2 | 5/2015 | Nitto et al. | |
| 2006/0205892 A1* | 9/2006 | Yang | C08G 69/04 525/419 |
| 2011/0245450 A1 | 10/2011 | Touraud et al. | |
| 2012/0184166 A1* | 7/2012 | Kurihara | D01F 6/82 442/181 |

FOREIGN PATENT DOCUMENTS

| | | |
|---|---|---|
| CN | 103602064 | 2/2014 |
| CN | 104017204 | 9/2014 |
| CN | 106753189 | 5/2017 |
| EP | 2476718 | 7/2012 |
| JP | 06032980 | 2/1994 |
| JP | H07228766 | 8/1995 |
| JP | 2000053762 A * | 2/2000 |
| TW | 201122019 | 7/2011 |
| TW | I471465 | 2/2015 |
| TW | I509021 | 11/2015 |
| TW | I542747 | 7/2016 |
| WO | 2011030910 | 3/2011 |

OTHER PUBLICATIONS

Ridgway (Structure property relationships of Ring-Containing Nylon 66 Copolyamides, Journal of Polymer Science: Part A-1, vol. 8, pp. 3089-3111, 1970). (Year: 1970).*
"Office Action of Taiwan Counterpart Application", dated Jul. 3, 2019, pp. 1-4.

* cited by examiner

Primary Examiner — Rachel Kahn
(74) Attorney, Agent, or Firm — JCIPRNET

(57) ABSTRACT

A modified nylon 66 fiber including a first repeating unit derived from adipic acid and hexamethylenediamine, a second monomer unit derived from a diacid or a diamine having a long carbon chain, a third monomer unit derived from a diacid or a diamine having a aromatic ring, and a fourth monomer unit derived from a cyclic diacid or a cyclic diamine is provided. The second monomer unit has 6 to 36 carbon atoms. The third monomer unit has 8 to 14 carbon atoms. The fourth monomer unit has 6 to 10 carbon atoms. Based on a total weight of the modified nylon 66 fiber, a content of the first repeating unit is 78 wt % to 94.8 wt %, a content of the second monomer unit is 0.1 wt % to 1 wt %, a content of the third monomer unit is 5 wt % to 20 wt %, a content of the fourth monomer unit is 0.1 wt % to 1 wt %.

8 Claims, No Drawings

MODIFIED NYLON 66 FIBER

CROSS-REFERENCE TO RELATED APPLICATION

This application claims the priority benefit of China application serial no. 201711363902.1, filed on Dec. 18, 2017. The entirety of the above-mentioned patent application is hereby incorporated by reference herein and made a part of this specification.

TECHNICAL FIELD

The disclosure relates to a modified nylon 66 fiber, and more particularly, to a modified nylon 66 fiber having high heat resistance, high wear resistance, and low denier per fiber.

BACKGROUND

Fibers with high heat resistance and high wear resistance may be widely used in various applications such as fire-fighting clothes, heat-insulating gloves, fire blankets and the like. Since nylon 66 may be modified to improve heat resistance and wear resistance, nylon 66 has potential as a raw material for heat resistant and wear resistant fabrics. However, the current modified nylon 66 has poor fluidity and cannot be made into spun fiber and may only be used as a material for injection and reprocessing. Therefore, the modified nylon 66 in prior art is usually only used in automobiles or electronic parts, and is not suitable as a material for fabrics.

In addition, since the heat resistance and wear resistance of the modified nylon 66 in prior art are not enough, if the modified nylon 66 is used in a high-temperature and high-wear environment, the material is easily lose its functions, so the modification of nylon 66 into a material having high heat resistance and high wear resistance that may be made into fibers is a major topic for the industry.

SUMMARY

The disclosure provides a modified nylon 66 fiber that may obtain high heat resistance, high wear resistance, and low denier per fiber.

A modified nylon 66 fiber of the disclosure includes a first repeating unit derived from adipic acid and hexamethylenediamine, a second monomer unit derived from a diacid having a long carbon chain or a diamine having a long carbon chain, a third monomer unit derived from a diacid having an aromatic ring or a diamine having a aromatic ring, and a fourth monomer unit derived from a cyclic diacid or a cyclic diamine. The second monomer unit has 6 to 36 carbon atoms. The third monomer unit has 8 to 14 carbon atoms. The fourth monomer unit has 6 to 10 carbon atoms. Based on a total weight of the modified nylon 66 fiber, a content of the first repeating unit is 78 wt % to 94.8 wt %, a content of the second monomer unit is 0.1 wt % to 1 wt %, a content of the third monomer unit is 5 wt % to 20 wt %, and a content of the fourth monomer unit is 0.1 wt % to 1 wt %.

In an embodiment of the disclosure, the first repeating unit is represented by, for example, formula 1:

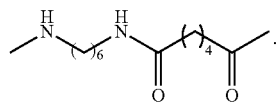

formula 1

In an embodiment of the disclosure, the second monomer unit is represented by, for example, formula 2-1 or formula 2-2:

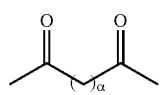

formula 2-1 wherein α is an integer of 4 to 18,

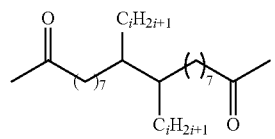

formula 2-2 wherein i is an integer of 2 to 9.

In an embodiment of the disclosure, the second monomer unit is derived from, for example, hexatriacontanedioic acid ($C_{36}H_{70}O_4$).

In an embodiment of the disclosure, the third monomer unit is represented by, for example, formula 3-1, formula 3-2, formula 3-3, or formula 3-4:

formula 3-1 wherein β is 1 or 2,

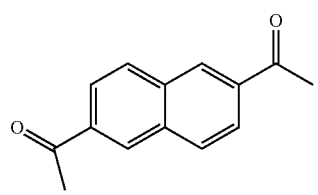

formula 3-2

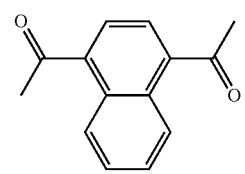

formula 3-3 formula 3-4

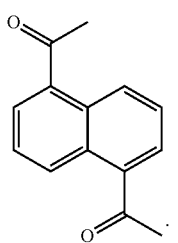

In an embodiment of the disclosure, the third monomer unit is derived from, for example, terephthalic acid.

In an embodiment of the disclosure, the fourth monomer unit is represented by, for example, formula 4-1, formula 4-2, formula 4-3, formula 4-4, or formula 4-5:

formula 4-1

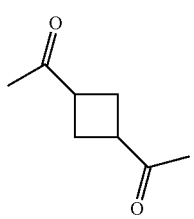

formula 4-2

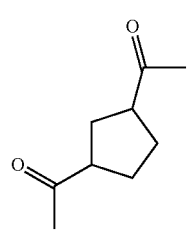

formula 4-3

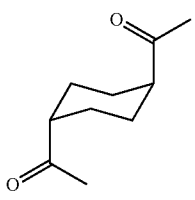

formula 4-4

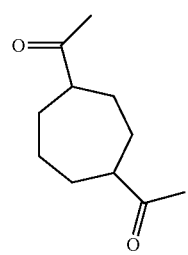

formula 4-5

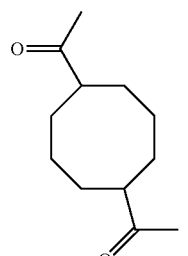

In an embodiment of the disclosure, the fourth monomer unit is derived from, for example, 1,4-cyclohexanedicarboxylic acid.

In an embodiment of the disclosure, the modified nylon 66 fiber has a melting point of, for example, greater than 267° C.

In an embodiment of the disclosure, the modified nylon 66 fiber has a fiber fineness of, for example, 65d/36f to 75d/36f.

Based on the above, the modified nylon 66 fiber could be better materials of the disclosure includes a first repeating unit derived from adipic acid and hexamethylenediamine, a second monomer unit derived from a diacid having a long carbon chain or a diamine having a long carbon chain, a third monomer unit derived from a diacid having an aromatic ring or a diamine having the aromatic ring, and a fourth monomer unit derived from a cyclic diacid or a cyclic diamine. Therefore, the modified nylon 66 fiber of the disclosure may obtain high heat resistance, high wear resistance, and low denier per fiber.

Several exemplary embodiments accompanied with figures are described in detail below to further describe the disclosure in details.

DETAILED DESCRIPTION OF DISCLOSED EMBODIMENTS

In order to satisfy with the demand for fabrics with high heat resistance and high wear resistance on the market, and to solve the issue that the fluidity of the modified nylon 66 in prior art is not good enough to be processed into fibers, the disclosure provides a modified nylon 66 fiber having high heat resistance, high wear resistance, and low denier per fiber via embodiments to clarify the above issue. However, the following embodiments are not intended to limit the disclosure.

The present embodiment provides a modified nylon 66 fiber. The modified nylon 66 fiber includes a first repeating unit derived from adipic acid and hexamethylenediamine, a second monomer unit derived from a diacid having a long carbon chain or a diamine having a long carbon chain, a third monomer unit derived from a diacid having an aromatic ring or a diamine having the aromatic ring, and a fourth monomer unit derived from a cyclic diacid or a cyclic diamine. The repeating units are described in the following.

First Repeating Unit Derived from Adipic Acid and Hexamethylenediamine

In the present embodiment, the first repeating unit is the base material of the modified nylon 66 fiber. The first repeating unit is polymerized with other repeating units added subsequently to form the modified nylon 66 fiber of the disclosure. The first repeating unit may be represented by formula 1:

formula 1

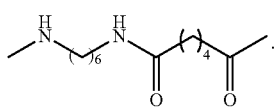

In the present embodiment, a content of the first repeating unit derived from adipic acid and hexamethylenediamine is 78 wt % to 94.8 wt % based on the total weight of the modified nylon 66 fiber formed, and the first repeating unit is used as the base material of the modified nylon 66 fiber.

Second Monomer Unit Derived from a Diacid Having a Long Carbon Chain or a Diamine Having a Long Carbon Chain In the present embodiment, the second monomer unit derived from a diacid having a long carbon chain or a diamine having a long carbon chain may change crystallization behavior, and the long carbon chain of the second monomer unit may increase the slidability of the molecular chain of a polymer disordered region. As a result, when subjected to a force, the formed modified nylon 66 fiber may effectively disperse the force to improve wear resistance. In addition, the long carbon chain of the second monomer unit may improve the fluidity of the formed modified nylon 66 fiber, and therefore the formed modified nylon 66 fiber may be processed to form a fiber having a low denier per fiber, thereby solving the issue that the nylon 66 in prior art has poor fluidity and as a result cannot be made into fibers.

In the disclosure, the second monomer unit derived from a diacid having a long carbon chain or a diamine having a long carbon chain has 6 to 36 carbon atoms. The second monomer unit may be represented by formula 2-1 or formula 2-2:

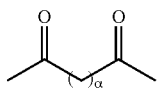

formula 2-1 wherein $\alpha$ is an integer of 4 to 18,

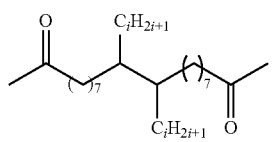

formula 2-2 wherein $i$ is an integer of 2 to 9.

In an embodiment, the second monomer unit may be derived from hexatriacontanedioic acid.

Further, in the modified nylon 66 fiber of the disclosure, the alkyl side chains of adjacent second monomer units may be physically crosslinked or entangled with each other, such that the formed modified nylon 66 fiber has good resilience.

In the present embodiment, a content of the second monomer unit derived from a diacid having a long carbon chain or a diamine having a long carbon chain is 0.1 wt % to 1 wt % based on the total weight of the modified nylon 66 fiber formed. When the content of the second monomer unit derived from a diacid having a long carbon chain or a diamine having a long carbon chain is in the above range, the modified nylon 66 fiber has good wear resistance and elasticity. On the other hand, if the content of the second monomer unit exceeds 1 wt %, then the molecular chain of the modified nylon 66 fiber may be too soft, and therefore fiber strength may be lost, such that the application range of the fiber product is limited.

Third Monomer Unit Derived from a Diacid Having an Aromatic Ring or a Diamine Having an Aromatic Ring In the present embodiment, the third monomer unit derived from a diacid having am aromatic ring or a diamine having an aromatic ring has a high melting point, and therefore the melting point of the modified nylon 66 fiber may be increased, such that the modified nylon 66 fiber has high heatresistance.

In the disclosure, the third monomer unit derived from a diacid having an aromatic ring or a diamine having an aromatic ring has 8 to 14 carbon atoms. The third monomer unit may be represented by formula 3-1, formula 3-2, formula 3-3, or formula 3-4:

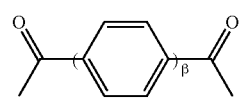

formula 3-1 wherein $\beta$ is 1 or 2,

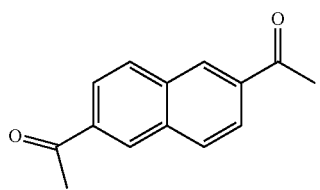

formula 3-2

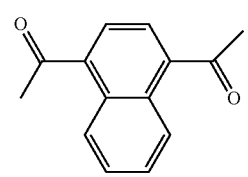

formula 3-3

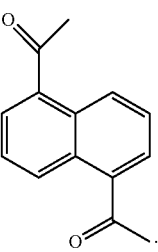

formula 3-4

In an embodiment, the third monomer unit may be derived from terephthalic acid.

In the present embodiment, a content of the third monomer unit derived from a diacid having an aromatic ring or a diamine having an aromatic ring is 5 wt % to 20 wt % based on the total weight of the modified nylon 66 fiber formed. When the content of the second monomer unit derived from a diacid having an aromatic ring or a diamine having an aromatic ring is in the above range, the modified nylon 66 fiber has good heat resistance. On the other hand, if the content of the third monomer unit exceeds 20 wt %, the melting point of the fiber raw material may be too high such that fluidity is lost, resulting in the spinnability being too low such that the fiber raw material cannot be made into fibers. In other words, when the proportion of the third monomer unit derived from a diacid having an aromatic ring or a diamine having an aromatic ring in the modified nylon 66 fiber is too high (for example, greater than 20 wt %), the content of the melt point of the modified nylon 66 fiber raw material may be lowered, causing dicing to be difficult such that melt spinnability is lost.

Fourth Monomer Unit Derived from a Cyclic Diacid or a Cyclic Diamine

In the present embodiment, the fourth monomer unit derived from a cyclic diacid or a cyclic diamine has a rigid structure which may strengthen the rigidity of the polymer chain of the modified nylon 66 fiber and improve the crystallinity of the crystalline region, such that the melting point of the modified nylon 66 fiber is increased.

In the disclosure, the fourth monomer unit derived from a cyclic diacid or a cyclic diamine has 6 to 10 carbon atoms. The fourth monomer unit may be represented by formula 4-1, formula 4-2, formula 4-3, formula 4-4, or formula 4-5:

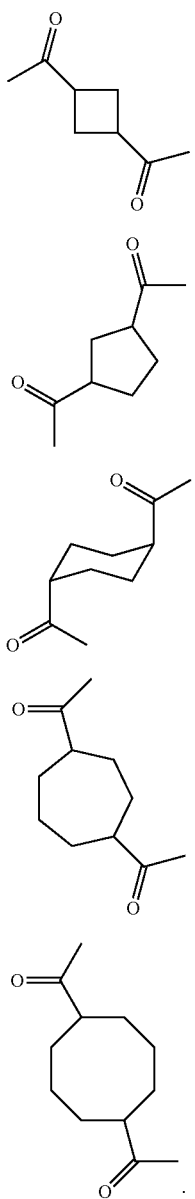

In an embodiment, the fourth monomer unit derived from a cyclic diacid or a cyclic diamine may be derived from 1,4-cyclohexanedicarboxylic acid.

In the present embodiment, a content of the fourth monomer unit derived from a cyclic diacid or a cyclic diamine is 0.1 wt % to 1 wt % based on the total weight of the modified nylon 66 fiber formed. When the fourth monomer unit derived from a cyclic diacid or a cyclic diamine is in the above range, the modified nylon 66 fiber has good wear resistance and heat resistance, and at the same time, may maintain spinning operation. On the other hand, if the content of the addition ratio is greater than 1 wt %, then the fiber raw material readily causes dicing to be unsatisfactory, thereby lowering spinnability. When the fourth monomer unit is derived from 1,4-cyclohexanedicarboxylic acid, since 1,4-cyclohexanedicarboxylic acid has a rigid structure, 1,4-cyclohexanedicarboxylic acid is flipped into a chair configuration at a high temperature (for example, greater than 300° C.). Therefore, if the content of 1,4-cyclohexanedicarboxylic is too high, for example, greater than 1 wt %, then the spinnability of the modified nylon 66 fiber raw material is lowered.

Hereinafter, the manufacturing method of the modified nylon 66 fiber of the disclosure is described.

In the disclosure, a reactor is used for synthesizing the modified nylon 66. The reactor has a stirring blade structure, an inner heating system, a temperature uniformity monitoring system, and a multi-stage batch feeding control system.

First, adipic acid and hexamethylenediamine are added into the reactor, the temperature is set between 200° C. and 240° C., and the pressure is set between 2 kg/cm$^2$ and 3 kg/cm$^2$ to perform polymerization to form nylon 66 (first repeating unit). Afterward, the temperature is raised to between 260° C. and 280° C. and the power of the torque device is set to 120 kW to 125 kW. Next, the third monomer unit derived from a diacid having an aromatic ring or a diamine having an aromatic ring and the fourth monomer unit having a cyclic diacid or a cyclic diamine are added to be polymerized the modified nylon 66. When the polymerization is performed, the third monomer unit derived from a diacid having an aromatic ring or a diamine having an aromatic ring and the fourth monomer unit derived from a cyclic diacid or a cyclic diamine are embedded in the nylon 66 to produce a modified nylon 66.

Then, the reactor is depressurized, and the second monomer unit derived from a dicarboxylic acid having a long carbon chain or a diamine having a long carbon chain is added into the reactor. Next, the temperature is raised to 300° C. to 310° C., and the pressure is adjusted to approximately 300 torr to 500 torr. At this point, the second monomer unit is polymerized with the modified nylon 66, and the modified nylon 66 is modified again to embed the second monomer unit derived from a diacid having a long carbon chain or a diamine having a long carbon chain in the modified nylon 66.

Lastly, the modified nylon 66 having the first repeating unit, the second monomer unit, the third monomer unit, and the fourth monomer unit is diced to form the modified nylon 66. The melting point of the modified nylon 66 formed by the manufacturing method of the disclosure is, for example, greater than 267° C., and more preferably, for example, greater than 275° C. Further, the modified nylon 66 fiber of the disclosure may have a low denier per fiber (for example, 65d/36f to 75d/36f).

The fiber strength of the modified nylon 66 fiber of the disclosure is, for example, 3.8 g/d to 4.19 g/d, and the wear resistance of the modified nylon 66 fiber is, for example, 550 cycles to 850 cycles, and therefore the mechanical properties of the modified nylon 66 fiber of the disclosure are better than those of the nylon 66 in the prior art.

In the present embodiment, the modifiers are added into reactor to perform the polymerization reaction, so that the modifiers may be uniformly embedded in the nylon 66 to avoid excessive concentration of the modifiers and improve the polymerization efficiency and product quality.

In addition, the product manufactured using the modified nylon 66 fiber of the disclosure may eliminate the need for matching fabrics, thereby achieving cost-saving effects. Moreover, compared with the prior art, the modified nylon 66 fiber of the disclosure has a relatively simple process, and therefore better production efficiency may be achieved with a yield of 80% or more.

Hereinafter, the feasibility and efficacy of the disclosure are described by Experimental examples 1 to 4 and Comparative examples 1 to 3. However, the following experimental examples are not intended to limit the disclosure.

Experimental Example 1

First, adipic acid and hexamethylenediamine were added into reactor, the temperature was set to 200° C., and the pressure was set to 3 kg/cm$^2$ to perform polymerization to forma nylon 66.

Next, the temperature was raised to 260° C., and the power of the torque device was set to 10 kW, and then terephthalic acid and 1,4-cyclohexanedicarboxylic acid were added and polymerized with the nylon 66 to produce a modified nylon 66.

Then, the reactor was depressurized, and hexatriacontanedioic acid was added to the reactor. Next, the temperature was raised to 310° C., and the reactor was vacuumed to about 500 torr, then hexatriacontanedioic acid was polymerized with the modified nylon 66. Lastly, the modified nylon 66 was diced to form a modified nylon 66 fiber.

In Experimental example 1, based on the total weight of the modified nylon 66 fiber, a content of the repeating unit derived from adipic acid and hexamethylenediamine (first repeating unit) was 89 wt %, a content of the repeating unit derived from hexatriacontanedioic acid (second monomer unit) was 0.5 wt %, a content of the repeating unit derived from terephthalic acid (third monomer unit) was 10 wt %, and a content of the repeating unit derived from 1,4-cyclohexanedicarboxylic acid (fourth monomer unit) was 0.5 wt %.

Experimental Example 2

The difference between Experimental example 2 and Experimental example 1 is only the contents of the nylon 66, 1,4-cyclohexanedicarboxylic acid, terephthalic acid, and hexatriacontanedioic acid. In Experimental example 2, based on the total weight of the modified nylon 66 fiber, a content of the repeating unit derived from adipic acid and hexamethylenediamine (first repeating unit) was 88.5 wt %, a content of the repeating unit derived from hexatriacontanedioic acid (second monomer unit) was 1 wt %, a content of the repeating unit derived from terephthalic acid (third monomer unit) was 10 wt %, and a content of the repeating unit derived from 1,4-cyclohexanedicarboxylic acid (fourth monomer unit) was 0.5 wt %.

Experimental Example 3

The difference between Experimental example 3 and Experimental example 1 is only the contents of the nylon 66, 1,4-cyclohexanedicarboxylic acid, terephthalic acid, and hexatriacontanedioic acid. In Experimental example 3, based on the total weight of the modified nylon 66 fiber, a content of the repeating unit derived from adipic acid and hexamethylenediamine (first repeating unit) was 78.5 wt %, a content of the repeating unit derived from hexatriacontanedioic acid (second monomer unit) was 0.5 wt %, a content of the repeating unit derived from terephthalic acid (third monomer unit) was 20 wt %, and a content of the repeating unit derived from 1,4-cyclohexanedicarboxylic acid (fourth monomer unit) was 1 wt %.

Experimental Example 4

The difference between Experimental example 4 and Experimental example 1 is only the contents of the nylon 66, 1,4-cyclohexanedicarboxylic acid, terephthalic acid, and hexatriacontanedioic acid. In Experimental example 4, based on the total weight of the modified nylon 66 fiber, a content of the repeating unit derived from adipic acid and hexamethylenediamine (first repeating unit) was 78 wt %, a content of the repeating unit derived from hexatriacontanedioic acid (second monomer unit) was 1 wt %, a content of the repeating unit derived from terephthalic acid (third monomer unit) was 20 wt %, and a content of the repeating unit derived from 1,4-cyclohexanedicarboxylic acid (fourth monomer unit) was 1 wt %.

Comparative Example 1

The difference between Comparative example 1 and Experimental example 1 is that polymerization was performed without adding 1,4-cyclohexanedicarboxylic acid, terephthalic acid, or hexatriacontanedioic acid.

Comparative Example 2

The difference of Comparative example 2 is the contents of the nylon 66, 1,4-cyclohexanedicarboxylic acid, terephthalic acid, and hexatriacontanedioic acid. In Comparative example 2, based on the total weight of the modified nylon 66 fiber, a content of the repeating unit derived from adipic acid and hexamethylenediamine (first repeating unit) was 99.5 wt %, a content of the repeating unit derived from hexatriacontanedioic acid (second monomer unit) was 0 wt %, a content of the repeating unit derived from terephthalic acid (third monomer unit) was 0 wt %, and a content of the repeating unit derived from 1,4-cyclohexanedicarboxylic acid (fourth monomer unit) was 0.5 wt %.

The modified nylon 66 fibers formed in Experimental examples 1 to 4 and Comparative examples 1 and 2 were subjected to a melting point test, fiber fineness measurement, and a standard wear resistance test, and the results are shown in Table 1.

TABLE 1

|  | Experimental example 1 | Experimental example 2 | Experimental example 3 | Experimental example 4 | Comparative example 1 | Comparative example 2 |
| --- | --- | --- | --- | --- | --- | --- |
| Melting point (° C.) | 267.8 | 268.2 | 275.7 | 274.8 | 260 | 265.1 |
| Fiber fineness (d/f) | 65d/36f | 70d/36f | 75d/36f | 68d/36f | 70d/36f | 70d/36f |

TABLE 1-continued

| | Experimental example 1 | Experimental example 2 | Experimental example 3 | Experimental example 4 | Comparative example 1 | Comparative example 2 |
|---|---|---|---|---|---|---|
| Wear resistance test (cycle) | 726 | 850 | 762 | 705 | 630 | 554 |

As shown in Table 1, Experimental examples 1 to 4 have higher melting points and better wear resistance than Comparative examples 1 and 2. Further, according to Table 1, Experimental examples 1 to 4 have low denier per fiber. Therefore, it may be concluded that the modified nylon 66 fiber of the disclosure may have high heat resistance, high wear resistance, and at the same time, low denier per fiber.

Based on the above, the modified nylon 66 fiber of the disclosure includes a first repeating unit derived from adipic acid and hexamethylenediamine, a second monomer unit derived from a diacid having a long carbon chain or a diamine having a long carbon chain, a third monomer unit derived from a diacid having an aromatic ring or a diamine having an aromatic ring, and a fourth monomer unit derived from a cyclic diacid or a cyclic diamine. Therefore, the modified nylon 66 fiber may have high heat resistance, high wear resistance, and at the same time, low denier per fiber.

It will be apparent to those skilled in the art that various modifications and variations may be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A modified nylon 66 fiber, comprising:
   a first repeating unit derived from adipic acid and hexamethylenediamine;
   a second monomer unit derived from hexatriacontanedioic acid ($C_{36}H_{70}O_4$);
   a third monomer unit derived from a diacid having an aromatic ring or a diamine having an aromatic ring, wherein the third monomer unit has 8 to 14 carbon atoms; and
   a fourth monomer unit derived from a cyclic diacid or a cyclic diamine, wherein the fourth monomer unit has 6 to 10 carbon atoms,
   wherein based on a total weight of the modified nylon 66 fiber, a content of the first repeating unit is 78 wt % to 94.8 wt %, a content of the second monomer unit is 0.1 wt % to 1 wt %, a content of the third monomer unit is 5 wt % to 20 wt %, and a content of the fourth monomer unit is 0.1 wt % to 1 wt %.

2. The modified nylon 66 fiber of claim 1, wherein the first repeating unit is represented by formula 1:

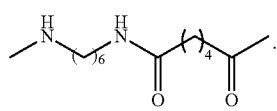

formula 1

3. The modified nylon 66 fiber of claim 1, wherein the third monomer unit is represented by formula 3-1, formula 3-2, formula 3-3, or formula 3-4:

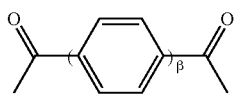

formula 3-1 wherein β is 1 or 2,

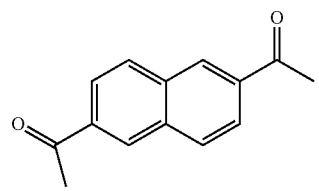

formula 3-2

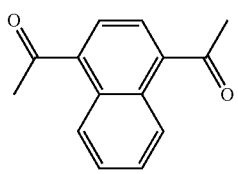

formula 3-3

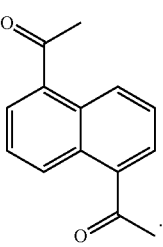

formula 3-4

4. The modified nylon 66 fiber of claim 3, wherein the third monomer unit is derived from terephthalic acid.

5. The modified nylon 66 fiber of claim 1, wherein the fourth monomer unit is represented by formula 4-1, formula 4-2, formula 4-3, formula 4-4, or formula 4-5:

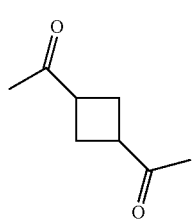

formula 4-1

-continued

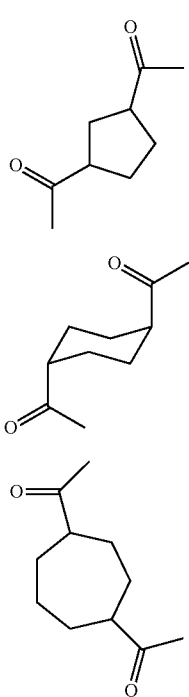

formula 4-2 formula 4-3 formula 4-4

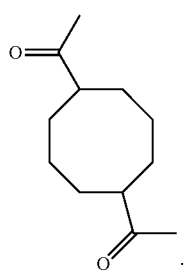

formula 4-5

6. The modified nylon 66 fiber of claim 1, wherein the fourth monomer unit is derived from 1,4-cyclohexanedicarboxylic acid.

7. The modified nylon 66 fiber of claim 1, wherein the modified nylon 66 fiber has a melting point of greater than 267° C.

8. The modified nylon 66 fiber of claim 1, wherein the modified nylon 66 fiber has a fiber fineness of 65d/36f to 75d/36f.

* * * * *